United States Patent [19]
Simonet et al.

[11] 3,738,084
[45] June 12, 1973

[54] ADSORPTION PROCESS AND AN INSTALLATION THEREFOR

[75] Inventors: Guy Simonet; Hubert Rico, both of Paris, France

[73] Assignee: L'air Liquide, Societe Anonyme Pour L'etude et L'exploitation des Procedes Georges Claude, Paris, France

[22] Filed: Feb. 22, 1972

[21] Appl. No.: 228,116

[30] Foreign Application Priority Data
Feb. 24, 1971 France.................................. 716216

[52] U.S. Cl. .......................... 55/31, 55/58, 55/62, 55/68, 55/75
[51] Int. Cl............................................. B01d 53/04
[58] Field of Search .................... 55/31, 33, 58, 62, 55/74, 75, 178, 208, 68

[56] References Cited
UNITED STATES PATENTS

| | | | |
|---|---|---|---|
| 3,085,379 | 4/1963 | Kiyonaga et al. ......................... | 55/62 |
| 3,150,942 | 9/1964 | Vasan ...................................... | 55/31 |
| 3,242,651 | 3/1966 | Arnoldi.................................... | 55/75 |
| 3,355,860 | 12/1967 | Arnoldi.................................... | 55/68 |

Primary Examiner—Charles N. Hart
Attorney—Irvin S. Thompson and Robert J. Patch

[57] ABSTRACT

An adsorption process and installation permitting at least the partial elimination of water and carbon dioxide contained in a gas to be purified, is provided. In adsorption phase, the gas is caused to flow in contact with an adsorbant substance contained in an adsorption vessel which includes in the direction of flow of the gas to be purified, a first adsorptive bed for the desiccation of said gas and a second adsorptive bed for the decarbonation of said gas. The adsorptive substance is regenerated in a regeneration phase which comprises a first stage wherein solely the second adsorptive bed is heated and the pressure of the adsorption vessel is reduced to effect desorption of the second adsorptive bed, a second stage wherein said heating is interrupted and the adsorptive substance is scavenged by a gas which has been purified at least partially of carbon dioxide and water so as to reheat the first adsorptive bed and to desorb the first adsorptive bed, and to cool the second adsorptive bed, and a third stage wherein the scavenging of the adsorptive substance is continued and solely the first adsorptive bed is cooled.

8 Claims, 1 Drawing Figure

PATENTED JUN 12 1973
3,738,084
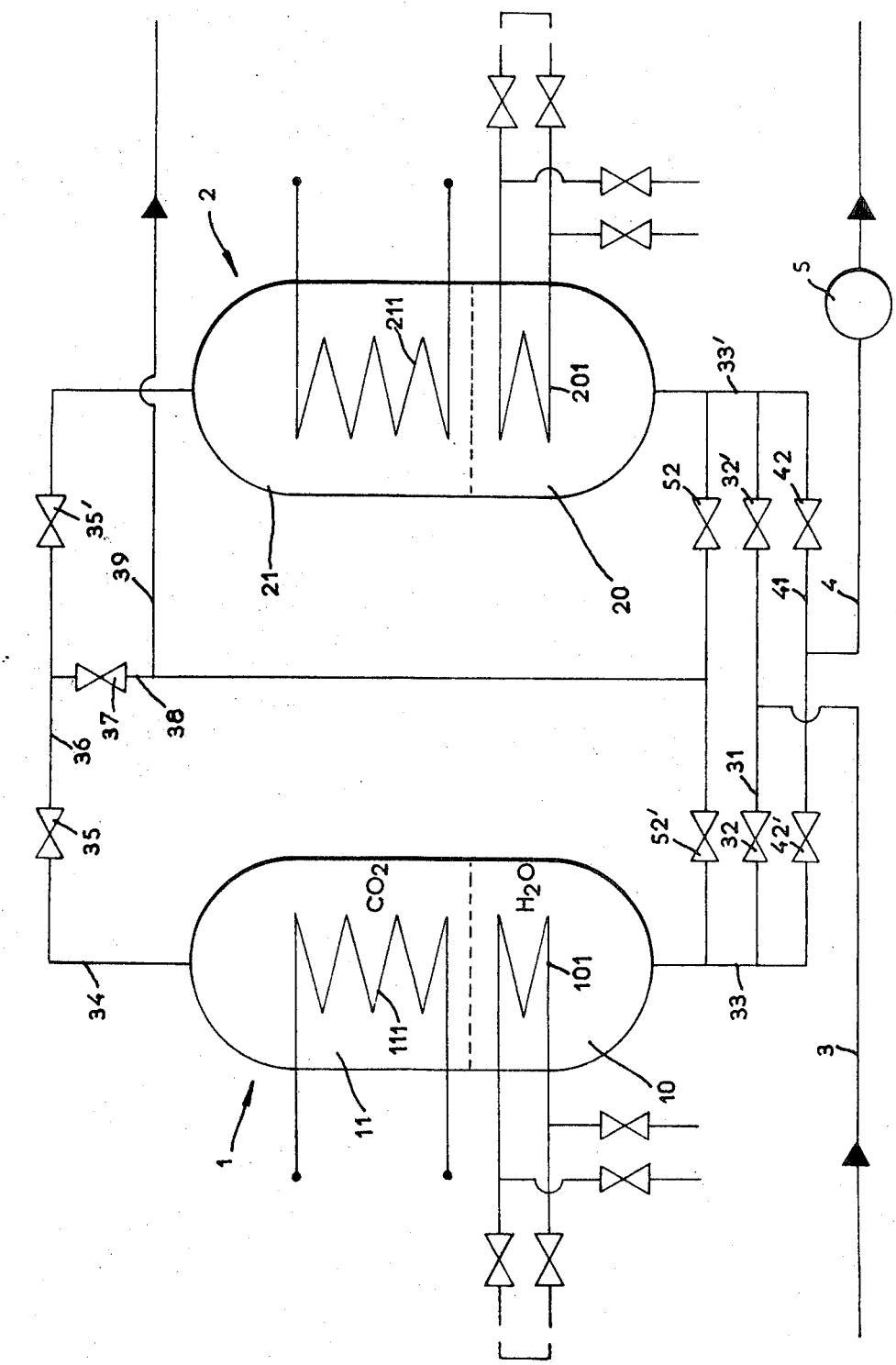

ADSORPTION PROCESS AND AN INSTALLATION THEREFOR

The present invention relates to an adsorption process permitting the elimination of the water and carbon dioxide gas contained in a gas to be purified; it relates also to an installation permitting the carrying into effect of a process according to the invention.

The invention is applied more particularly to the regeneration of the air of an insulated and sealed vessel (by desiccation and decarbonation), such as the air of a submarine caisson, an aircraft, etc.

The process according to the invention employs an installation for simultaneous disiocation and decarbonation comprising, for example, two adsorption vessels arranged in parallel, or adsorbers each comprising an adsorptive substance constituted by an adsorptive bed for the desiccation of the gas or gaseous mixture to be purified and an adsorptive bed for the decarbonation of the said gas.

The present invention relates more particularly to an adsorption process and installation permitting the total cooling of the adsorptive substance with comsumption of the minimum amount of energy for heating the latter.

Thus, the present invention relates to an adsorption process permitting the at least partial elimination of the water and carbon dioxide gas contained in a gas to be purified wherein, in an adsorption phase, the said gas is caused to flow in contact with an adsorptive substance contained in an adsorption vessel, and comprising, in the direction of flow of the said gas to be purified, an adsorptive bed for the desiccation of the said gas and an adsorptive bed for the decarbonation of the said gas and, during a regeneration phase, the said adsorptive substance is regenerated. According to the invention, the regeneration phase comprises a first stage wherein solely the decarbonation bed is heated and the pressure of the adsorption vessel is reduced to effect desorption of at least the decarbonation bed, in counter-flow relative to the direction of flow of the said gas to be purified, a second stage wherein the said heating is interrupted and the adsorptive substance is scavenged, in counter-flow relative to the said direction of flow, by a gas purified at least partially of carbon dioxide gas and of water, preferably by the purified gas obtained during the adsorption phase, for reheating the desiccation bed and desorbing at least the latter, and for cooling the decarbonation bed, and a third stage wherein the scavenging of the adsorptive substance is continued and solely the desiccation bed is cooled.

Consequently, according to the invention, during the second stage of the regeneration phase, the scavenging of the adsorptive substance effected in counter-flow relative to the direction of flow of the gas to be purified during the adsorption phase permits simultaneously the cooling of the decarbonation bed and the heating of the desiccation bed, due to transfer of the heat which has accumulated during the first regeneration stage, from the decarbonation bed to the desiccation bed. Thus, it becomes possible to dispense with independent cooling and heating, respectively of the decarbonation bed and of the desiccation bed. Thus, an economy is achieved in respect of the heat energy which would otherwise require to be utilised for the heating of the desiccation bed. On the other hand, according to the invention, the regeneration phase is accelerated.

The invention also relates to an installation for the carrying into effect of the process defined hereinabove, comprising at least one adsorption vessel in which an adsorptive substance is disposed, characterised in that it comprises heating means disposed in a portion of the said adsorptive substance and cooling means disposed in a further portion of the said substance.

An installation according to the invention is therefore characterised by bulk which is smaller than that of an installation wherein the heating and cooling means occupy the whole of the adsorptive substance employed.

Further objects and advantages of the present invention will be disclosed on reading the detailed description given hereinbelow and on studying the figures and the accompanying examples which illustrate or represent, by way of non-limitative example, various embodiments of the invention.

The installation shown in the accompanying single FIGURE comprises two conventional adsorption vessels (or adsorbers) 1 and 2 containing an adsorptive substance constituted for example by two adsorptive beds 10 and 20 respectively for the adsorption of the water or desiccation and 11 and 21 for the adsorption of carbon dioxide gas or decarbonation.

Embedded in the mass of the adsorption beds 11 and 21 are, respectively, heating means or electrical resistors 111 and 211, whereas embedded in the mass of the adsorption beds 10 and 20 are, respectively, cooling means or coils 101 and 201 for the circulation of a cooling fluid such as demineralised water. The said water is able to circulate in a closed circuit in the said coils due to the action of pumps (not shown), heat exchangers (not shown) provided in the external water circuit.

During an adsorption phase, the air, or any other gas to be purified, entering through a conduit 3 is for example fed via the conduits 31 and 33 towards the adsorber 1, the valve 32 being open and the valve 32' then being closed. The said air to be purified thus flows in contact successively with the adsorptive beds 10 and 11 on which, respectively, the water and at least a portion of the carbonic anhydride contained in the said air are retained.

The adsorptive beds are such that they retain all the water and all or a part of the carbon dioxide gas, depending on the proportion which it is desired to retain, during the adsorption phase.

The air purified of water and of the proportion of $CO_2$ to be retained leaves the adsorber through the conduits 34, 36, 38 and 39, the valves 35 and 37 being open; the valve 35' is closed during at least a portion of this cycle.

The adsorber 2 undergoes, during this time, a regeneration phase.

Regeneration is effected in the following manner, in three stages:

In a first stage, the valve 35' being closed, the electrical resistor 211 is put into operation for heating solely the adsorptive bed 21 of the adsorber 2; simultaneously, the valves 52 and 32' being closed and the valve 42 open, a pressure reduction is established in the adsorber 2 due to the action of the pump 5 disposed in the conduit 4. In this way, the decarbonation bed is desorbed in counter-flow relative to the direction of flow of the gas to be purified in the adsorber 1.

In a second stage, heating of the bed 21 is interrupted, the valve 35' is open and the adsorptive bed 21 is scavenged by the purified gas coming from the adsorber 1, in counter-flow relative to the direction of flow of the gas to be purified in the adsorber 1, thus cooling the bed 21 and, during flow of the gas over the bed 21, heating the latter, the valve 42 then being closed whereas the valve 52 is open, so that the scavenging gas is returned to the conduit 39. In this way, the desiccation bed is desorbed.

During the first of these two stages, the suction pump 5 is operative and the coil 201 is purged of its water, whereas in the second stage the said pump is out of circuit.

In the third stage, scavenging of the adsorptive substance with the purified gas is continued and the cooling water is admitted into the coil, thus cooling solely the desiccation bed 20. This third stage commences only when the temperature attained in the bed 20 is too high. This temperature is, of course, a function of the adsorptive employed. It may for example be of the order of 200°C.

In certain cases, during the third stage of the regeneration phase, the only scavenging of the adsorptive substance is sufficient to effect the cooling of the desiccation bed 20.

EXAMPLE 1

There is employed a column 30 mm in diameter, containing a desiccation bed 15 cm high and consisting of an alumina mass and a decarbonation bed 75 cm high and consisting of zeolite 13X. At the end of a regeneration phase of 90 minutes, comprised of the two first regeneration stages mentioned hereinabove, it is found that the alumina mass attains 50°C to 60°C.

EXAMPLE 2

Under the same conditions as those mentioned in Example 1, although the third stage of the regeneration cycle is put into operation at the 33rd minute when the temperature of the desiccation bed has reached approximately 200°C, it is found that, due to the water circulation, the temperature of the desiccation bed returns to ambient temperature before the end of the regeneration phase.

Of course, the invention is in no way limited to the embodiments described and illustrated; it is capable of numerous further variants, such as would be within the scope of the person skilled in the art, depending on the applications envisaged and without thereby exceeding the scope of the invention. It should be pointed out that the said cooling means (coils 101 – 201) may advantageously be employed during adsorption for eliminating the heat produced in the corresponding substance by the adsorption itself.

What we claim is :

1. An adsorption process permitting at least the partial elimination of water and carbon dioxide contained in a gas to be purified of the type in which, during an adsorption phase, said gas is caused to flow in contact with an adsorptive substance contained in an adsorption vessel which includes, in the direction of flow of said gas, a first adsorptive bed, for the desiccation of said gas, and a second adsorptive bed, for the decarbonation of said gas, and in which, during a regeneration phase, said adsorptive substance is regenerated, wherein the improvement comprises employing a regeneration phase which comprises (a) a first stage wherein solely the second adsorptive bed is heated and wherein the pressure of the adsorption vessel is reduced to effect desorption of at least the second adsorptive bed, in counter current-flow relative to the direction of flow of said gas to be purified, (b) a second stage wherein said heating is interrupted and the adsorptive substance is scavenged, in counter current-flow relative to said direction of flow, by a gas purified at least partially of carbon dioxide and water, for heating the first adsorptive bed and desorbing at least the first adsorptive bed, and for cooling the second adsorptive bed, and (c) a third stage wherein the scavenging of the adsorptive substance is continued and solely the first adsorptive bed is cooled.

2. An adsorption process according to claim 1, wherein during the third stage, a further cooling of the first adsorptive bed is effected by the circulation of a cooling fluid in said bed.

3. An adsorption process according to claim 1 in which said gas purified at least partially of carbon dioxide and water is purified gas obtained during the adsorption phase.

4. An installation for the carrying into effect the adsorption process according to claim 1, which comprises at least one adsorption vessel wherein there is disposed an adsorptive substance, and wherein the vessel comprises heating means disposed in a portion of said adsorptive substance and cooling means disposed in a further portion of said adsorptive substance.

5. An installation as claimed in claim 4, wherein the adsorptive substance comprises a first adsorptive bed for the desiccation of the gas to be purified and a second adsorptive bed for the decarbonation of said gas, and wherein the heating means is disposed in the second adsorptive bed and the cooling means is disposed in the first adsorptive bed.

6. An installation as claimed in claim 5, wherein the heating means and the cooling means are embedded, respectively, in the decarbonation bed and the desiccation bed.

7. An installation as claimed in claim 6, wherein the cooling means comprises a conduit embedded in the first adsorptive bed for the circulation of a cooling fluid.

8. An installation as claimed in claim 7, wherein said conduit is constituted by a coil and wherein said cooling fluid consists of demineralised water.

* * * * *